United States Patent Office 3,353,954
Patented Nov. 21, 1967

3,353,954
METHOD OF PRODUCING COMPACTS BY REACTING PARTICULATE INGREDIENTS
Lloyd Stuart Williams, East Hawthorn, Victoria, Australia, assignor to Commonwealth Scientific and Industrial Research Organization, Melbourne, Victoria, Australia, a body corporate
No Drawing. Continuation of application Ser. No. 39,202, June 28, 1960. This application Jan. 18, 1965, Ser. No. 426,407
Claims priority, application Australia, June 30, 1959, 50,338/59
12 Claims. (Cl. 75—201)

This application is a continuation of my copending application Ser. No. 39,202, filed June 28, 1960 now abandoned.

This invention relates to processes for the production of compacts and seals of the type in which particulate materials or adjacent bodies or surfaces are united by means of a cement or bonding phase. The invention is particularly applicable for use in connection with ceramic materials but is not limited in its application thereto.

By the term "ceramic" as used in this specification is meant an inorganic compound capable of fabrication by powder-forming operations and heat-treatment into solid crystalline products which are usually refractory and largely non-metallic in character, where the term "refractory" implies a high degree of chemical, structural, and dimensional stability at temperatures of the order of 1000° C. or above. The actual products themselves may also be termed "ceramics" by common usage.

In accordance with modern technical usage, the term "ceramic" is generally accepted to include inter alia the following groups of materials: oxides, carbides, nitrides, borides, sulphides, phosphides, and crystalline silicates. Some of the materials in these groups border on the broad class of materials now commonly known as "intermetallics," and some groups of intermetallics include materials which are largely ceramic in character. The boundary between the two classes, ceramic and intermetallic, is not well defined.

It is known to make ceramic compacts in which particles of a relatively refractory nature are incorporated in a matrix or cement which is capable of reacting chemically with the surfaces of the particles and thereby forming a bond with them. Established techniques in this field use cements or bonding agents which are generally ground up and mixed in powder form before a sintering operation takes place. Such articles, however, may suffer from "open" porosity, distortion, excessive shrinkage and other defects which are inherent in this process, largely because it is not possible to get sufficient and adequately uniform compaction prior to and/or during the sintering operation.

Further, it is difficult to develop special properties in articles so bonded, such as a desired degree of electrical and/or thermal conduction combined with high refractoriness and gas- or vacuum-tightness, because of the narrow choice of suitable refractory cements or bonding phases and the properties thereof (which may alter during the sintering operation), and because the temperatures required to satisfactorily sinter compacts bonded with such refractory cements are usually inconveniently high.

In the case of metallic alloys, two or more components may be united by melting at least one of them, but the refractory nature of most ceramics requires unsuitably high temperatures in a corresponding procedure.

It is known to form compacts by mixing a carbide such as tungsten or titanium carbide in powdered form together with a powdered metal cementing agent such as cobalt or nickel and either cold-compacting the mixture and then sintering the compact in a vacuum or suitable atmosphere, or subjecting the mixture to combined heat and mechanical pressure in a graphite or carbon mold to which a protective atmosphere may be introduced. More generally, the procedures of hot-pressing, of slip-casting, cold-compacting or extrusion followed by sintering, and of compacting and sintering followed by infiltration, may be applied to the fabrication of ceramic-metal composites (known as cermets, of which bonded carbides may be considered a particular case), ceramic-intermetallic composites, and intermetallic-metal composites and although formation of some quantity of an intermetallic-type phase could occur incidentally in such cases, no case is known in which the formation by reaction in situ of a bonding phase or matrix consisting wholly or mainly of one or more compounds of the intermetallic type is employed as the essential basis of a procedure for fabricating compacts of the types described hereinafter in this specification, and as a primary factor in determining the properties of these compacts.

An object of the invention is to permit many of the products generally fabricated by the known procedures referred to above, to be made at lower temperatures, in shorter times, and with lower total and "open" porosities, as well as with a wider variation of desired properties.

A further object is the provision of an improved process for the manufacture of composite bodies in which an important constituent or constituents is or are dispersed as discrete or separate particles in a continuous phase or matrix, such products being often referred to as "dispersion-type composites."

A still further object is to provide improved methods for dispersing incorporating or consolidating particulate materials, and especially ceramic particulate materials, in a suitable cement or matrix.

It is also known that ceramic-metal seals (including the particular case of glass-metal seals) can be effected through a metallic phase, either by brazing or soldering, and/or by sintering. The brazed or soldered seals are generally not very refractory, while it is difficult to obtain a gas-tight and/or vacuum-tight refractory seal by the sintering procedure without resorting to very high temperatures.

A further object of the invention is accordingly to provide an improved process for producing seals between two or more ceramic bodies, between ceramic and metal bodies, or between two or more metal bodies which cannot be satisfactorily joined by other means.

A still further object is to provide a process for the production of seals of the type referred to which overcomes the limitations of existing procedures as referred to above, and in addition permits convenient control over properties such as the electrical and thermal conductivities of refractory gas- and/or vacuum-tight seals by such means as the use of diluents and graded compositions combined with the wide choice of materials permitted by the invention.

According to this invention, a reaction-pressing process for dispersing, incorporating or consolidating particulate materials in a matrix, or for joining bodies (which may be in solid or particulate form at the start of the process) to make a seal by means of a cement or bonding phase, comprises the steps of thoroughly mixing together elements or compounds capable of reacting to form one or more compounds of the intermetallic type such as silicides, borides, aluminides, titanides, zirconides, antimonides, germanides, beryllides, and stannides and subjecting these elements or compounds and the said materials or bodies, to conditions of heat and pressure such that an intermetallic-type compound or compounds is or are formed as the whole or major part of a continuous phase or matrix cementing the said materials or bodies together. Normally, the elements of compounds capable of reacting to form the intermetallic compound or compounds are mixed in stoichiometric proportions but other proportions may be used, and in some instances, preferred. For example, proportions of reactants other than stoichiometric may be used to vary the properties or to control the rate of reaction. The process of the invention is of particular interest in connection with the production of compacts containing ceramic particulate materials, but may be used to produce compacts containing other compounds in particulate form, or elemental powders, for example, powders of uranium or other fissile or fertile metal in a nuclear fuel element, or boron in a reactor control rod.

It has been found that considerable quantities of powdered diluent material can be mixed with the components of one or more compounds of the intermetallic type without inhibiting reaction or preventing the formation of a dense, continuous, intermetallic-type matrix. The amount of diluent that can be incorporated depends on many factors, such as particle size and shape, size and geometry of the compact or seal, temperature, pressure, rate of heating, time of holding at the final temperature, friction between components of the containing mold, and the porosity and other properties acceptable in the product. The diluent, or portion of it, may in certain cases be one or more intermetallic-type compounds of the type formed in the matrix or one or more of the components of such compound or compounds, added for the purpose of varying the properties or controlling the rate of reaction.

Particulate ceramic or other diluent materials to be incorporated in an intermetallic-type matrix may be introduced during the mixing of the components of the intermetallic-type compound(s) or in a subsequent mixing operation, the proportion of diluent being less than that which would prevent a reaction between the components of the intermetallic-type compound(s) being initiated and sustained, as determined by experiment for the particular circumstances.

The mixture is then heated under pressure in a mold to the temperature required to initiate and sustain the reaction. This temperature generally increases gradually as the quantity of diluent material is increased up to a limit where the reaction can no longer be initiated and sustained, and/or the intermetallic-type compound(s) do not form a continuous matrix. The total porosity is generally low or negligible after this treatment, and the "open" porosity frequently nil, but heating may be continued to higher temperatures if further reduction in porosity is necessary.

An important requirement for the reaction-pressing technique according to the invention is that the pressure should be positively sustained throughout, otherwise gross porosity may result due to the sudden or rapid volume contraction that commonly occurs with reaction of the components of the intermetallic-type compound(s). A simple and positive loading method is obtained by means of one or more plungers operated by a hanging weight and lever system, and a particular advantage of such an arrangement is that the dynamic loading effect resulting from a volume contraction accompanying the reaction is used to advantage in eliminating porosity. Also, the movement of the lever and hanger in such cases provides a convenient indication of reaction. Pressing is usually unidirectional, either single-ended or double-ended, but in some cases it may be desirable to incorporate lateral pressure. It is important that the plungers should be a good free-sliding fit, and, for double-ended pressing, evenly matched.

A simple arrangement for single-ended pressing consists of a lever working about a fulcrum attached to one pillar of a pre-existing press frame. To the end of the lever is attached a hanger to which a load is applied in the form of lead weights. Between the hanger and the fulcrum is attached a swivel head which bears on the top surface of a plunger inserted into a mold containing the work.

A convenient arrangement for double-ended pressing consists essentially of a pin-jointed parallelogram with one diagonal vertical, the loading points being located at opposite ends of this diagonal. The joint at the lower end of the vertical diagonal is guided for movement in a vertical direction only by means of a pin which is fitted to slide within a vertical bearing rigidly secured to a base frame, while the joint at the upper end of the vertical diagonal can also move vertically. A plunger extends downwardly from the joint at the upper end of the vertical diagonal so as to bear vertically downwards into the upper end of a mold containing the work while a similar plunger extends upwardly from the joint at the lower end of the vertical diagonal so as to bear vertically upwards into the lower end of the mold. The load is applied through two equal lever arms, which are extensions of the two adjacent lower sides of the parallelogram. The two fulcrums are at opposite ends of the horizontal diagonal of the parallelogram, and rollers enable these joints to move laterally as the loading points come closer together with compaction of the work. Two equal loads in the form of lead weights are applied to hangers attached to the outer ends of the lever arms.

It is desirable to compact the mixture in the mold before reaction-pressing, by tamping, ramming, vibrating, jolting, cold-pressing or similar operation, particularly if the required length in the direction of pressing is appreciably greater than the lateral dimensions (as with a rod or bar). This procedure not only enables more material to be inserted into a mold of given size, but reduces the length and speed of plunger travel, which may become critical in making long rods.

The basic requirements for the mold materials are adequate strength at reaction-pressing temperatures, abrasion resistance, and minimal reactivity with components of the work charge in the range of temperatures employed. Other desirable features of the mold material are low expansion coefficient to facilitate extraction of the reaction-pressed products from the molds, and adequate high-freqency susceptance if induction-heating is employed. To date, graphite has generally been used as the mold material. With standard electrode-grade graphite, safe pressures are limited to 2000–3000 lb./sq. inch, but with special grades pressures of the order of 10,000 lb./sq. in. can be used. An application of the process of the present invention lies in the development of improved mold materials (such as oxide dispersion in borides of silicides), which in turn will extend the range of materials, conditions, and products for which the invention can be used.

In a further application of the invention, ceramic and/or metallic articles or materials may be cemented or sealed together by introducing the components of an intermetallic-type compound(s) (as the whole or major part of the sealing cement) between them and pressing the assembly in a mold while the mold and contents are heated to the temperature required to initiate and sustain the reaction between the components of the intermetallic-type compound(s), and to form a bond at the interfaces between the sealing material and the articles or materials being joined. A protective or inert atmosphere such as argon or helium may sometimes be required, more particularly if one of the materials is a metal. In the case of thin seals, it may not be necessary to contain the work in a mold. In general, however, the amount of bonding material required to effect a satisfactory seal by the essentially dynamic process of the invention will be such that a retaining mold is required. Single-ended unidirectional pressing is usually adequate, provided that the pressure is positively sustained throughout the reaction-pressing operation. If one of the materials to be joined is itself an intermetallic-type compound, it may prove suitable for direct sealing to the other material by reaction-pressing without an intermediate layer. The materials to be joined and the sealing material should preferably have similar thermal expansion characteristics. The discrepancy in thermal expansion that can be tolerated will depend upon, inter alia, the strengths of the individual materials to be joined, the strength of the cement or bonding phase, and the strength of the bonds formed at the interfaces between the bonding phase and the materials being joined.

In another application of the invention, materials in powder form can be joined together by means of a sealing cement consisting wholly or mainly of an intermetallic-type compound(s), the powders being consolidated as in normal hot-pressing, concurrently with the formation of the intermetallic-type compound(s) in the sealing cement.

It is to be understood that the invention also includes a process by which compacts are molded from particulate ceramic and/or metallic materials, and in a further operation joined together to form a composite body by means of a bonding material in accordance with the invention.

In order that the invention may be more fully understood, particular embodiments thereof will now be described by way of example.

Example I

It was desired to make small cylindrical rods of alumina ($Al_2O_3$) dispersed in molybdenum disilicide ($MoSi_2$), the composition being varied to illustrate the range of composition practicable in a typical case. To this end, Mo and Si powders were mixed in stoichiometric proportions for $MoSi_2$ in a mechanical mortar for half an hour, the required amount of calcined $Al_2O$, (40 wt. percent in the first case) (51.2 vol. percent) was added and mixing was continued for a further half hour. The mixture was packed into a graphite mold with a cavity 3½″ long by ⅝″ diameter (the lower end of the cavity being sealed by a graphite plug ¾″ long) by tapping the mold and contents on the workbench, leaving room for a graphite plunger to be inserted into the top of the cavity to a depth of at least ¾″. The mold was mounted vertically inside a high-frequency induction-heating coil (being one convenient method of heating rapidly). Lead weights were used to transmit a pressure loading to the plunger by means of a simple lever system described above for single-ended pressing.

At the start of the process, a load of 1500 lb. per square inch was applied, and the temperature was raised by induction heating to 800° C. in a period of about 5 minutes. The load was then increased to 2500 lb. per square inch and heating was continued rapidly until reaction occurred. The occurrence of reaction was marked by the downward movement of the loaded lever system as the plunger followed the contraction caused by the molybdenum and silicon in the mixture reacting to form $MoSi_2$. The reaction-contraction was substantially complete in a matter of seconds; the downward movement of the loading system was rapid, after a small but perceptible slower movement corresponding to the onset of reaction and overcoming the inertia and friction of the loaded mold assembly. The apparent reaction temperature is usually between 1150° C. and 1350° C. for these proportions of finely powdered components (i.e. 60 wt. percent $MoSi_2$:40 wt. $Al_2O_3$), whereas for $MoSi_2$ alone the reaction temperature is usually between 1100° C. and 1200° C. Heating was continued at the reaction temperature (1230° C. in a typical case) for 10 minutes and a strong product was obtained of length approximately ¾″ and diameter ⅝″, having a total calculated porosity of 3.2% and an open porosity of less than 0.5%.

Two other compositions of the same components were compacted by the same procedure. In the case of the 50 wt. percent $MoSi_2$:50 wt. percent $Al_2O_3$ (38.8:61.2 vol. percent) mixture the apparent reaction temperature was in the range 1200° C. to 1400° C. (1260° C. in a typical case), and a product was obtained having a total calculated porosity of 4.5% and an open porosity of 1.2 percent. In the case of the 40 wt. percent $MoSi_3$:60 wt. percent $Al_2O_3$ (29.7:70.3 vol. percent) mixture the apparent reaction temperature was in the range 1250° C. to 1450° C. (1300° C. in a typical case) and the product had a total porosity of 8.5 percent, the open porosity being 4.8 percent.

When pre-reacted $MoSi_2$ was substituted for the stoichiometric mixture of the elements in the above cases and the mixtures were compacted by conventional hot-pressing, the products were weak and very porous.

The finishing temperature for the reactive mixtures was next increased to 1650° C. to observe the effect on open porosity. In this case the open porosity of the 60:40 mixture was reduced to a negligible value within experimental error, and that of the 50:50 mixture was reduced to less than 0.5 percent. Only in the 40:60 case did the open porosity remain above 4.5%, the value being 2.6%. When pre-reacted $MoSi_2$ was again substituted for the stoichiometric mixture of the elements, the products were much more porous than for the reaction-pressed mixtures, the closest approach being in the 40:60 case where an open porosity of 8.1 percent was obtained.

Thus the superiority of the reaction-pressing procedure over the known hot-pressing procedure is established for a range of compositions of typical components.

Example II

It was desired to investigate the reaction-pressing of mixtures of $MoSi_2$ with other ceramics of technical interest, notably zirconia ($ZrO_2$), thoria ($ThO_2$), magnesia (MgO) and silicon carbide (SiC). Reactive mixtures of 60:40, 50:50, and 40:60 wt. percent $MoSi_2$:additive were prepared as described above and reaction-pressed by the same procedure, and compared with similar mixtures with pre-reacted $MoSi_2$ prepared and hot-pressed in similar conditions. The general pattern of the results was similar, and in all cases the reaction-pressed product was superior to the product of conventional hot-pressing; in one case, 40:60 $MoSi_2$:SiC, a definite reaction-compaction was not observed, and in the case of 40:60 $MoSi_2$:MgO the reaction-compaction range extended beyond the range of 1250° C. to 1450° C. given for 40:60 $MoSi_2$:$Al_2O_3$. The porosities of the 40:60 $MoSi_2$:SiC compacts were accordingly relatively high (of the order of 20%), as also were the porosities of the 40:60 $MoSi_2$:MgO compacts when the finishing temperature was limited to the temperature of apparent reaction or slightly above. It should be noted that SiC is known to be a difficult material to fabricate into dense shapes by conventional means; also, SiC and MgO have lower densities than $Al_2O_3$, and thus 60 wt. percent of these materials occupies a greater volume than 60 wt. percent of $Al_2O_3$. On the other hand, $ThO_2$ has a considerably higher density than $Al_2O_3$ and hence 60 wt. percent of $ThO_2$ occupies a considerably smaller volume than the same weight of $Al_2O_3$. Thus it was found that the quantity of $ThO_2$ added to an $MoSi_2$:$ThO_2$ mixture could be increased to 70 wt. percent without unduly impeding the reaction-compaction.

From the foregoing comments it is apparent that the process is applicable to the fabrication of dispersion-type composites of $MoSi_2$ and a range of ceramics additional to $Al_2O_3$. Further, apparent shortcomings with regard to high loadings of SiC and MgO have been explained, and the general superiority of the reaction-pressing process over conventional hot-pressing in the range of conditions and compositions investigated has been established.

Example III

This example is virtually an extension of Example II, with pre-reacted $MoSi_2$ replacing the ceramic diluent, the addition being made in this case to retard the speed of reaction-compaction, which may be conveniently high when reaction-pressing relatively long objects such as cylinders of length more than twice the diameter. Accordingly, a mixture of 60 wt. percent of the component elements for $MoSi_2$ with 40 wt. percent of pre-reacted $MoSi_2$ was prepared and reaction-pressed as described in Example I. The reaction-compaction was rapid, but not excessively so, and occurred at 1260° C. in a typical case, the normal temperature range for such mixtures being 1200° C. to 1350° C. Heating was continued for 10 minutes at or slightly above the reaction temperature. The dimensions of a typical product were in the desired proportions of length approximately equal to twice the diameter (1¼" x ⅝" dia.) and the calculated total porosity was 8.5%, open porosity being determined as 3.4%. A compact prepared from entirely pre-reacted $MoSi_2$ by conventional hot-pressing in similar conditions was very weak and porous.

The two preparations were repeated, increasing the finishing temperature to 1650° C. The calculated total porosity of the reaction-pressed compact was reduced to 5.2% and the open porosity to 1.8%; the hot-pressed compact was stronger than previously but still very porous, the total porosity being of the order of 20% and the open porosity 14%.

Thus the control of the speed of reaction-compaction by adding pre-reacted material was demonstrated, and further evidence obtained of the superiority of the reaction-pressing process over conventional hot-pressing.

*Example IV*

It was desired to demonstrate the influence of particle size and shape on the reaction-compaction of a typical composition. For this purpose a 60:40 wt. percent mixture of the component elements for $MoSi_2$:fused $Al_2O_3$ (—300 mesh) mixture was prepared and reaction pressed as described in Example I. The reaction-compaction occurred at 1200° C. in a typical case, and after heating for 10 minutes at or slightly above this temperature a strong but relatively porous compact was obtained. The calculated total porosity was 24.5% and the observed open porosity 16.2%, by contrast with the figures of 3.2% and less than 0.5%, respectively, given for similar proportions of $MoSi_2$ and $Al_2O_3$ in Example I. The important difference is that the calcined $Al_2O_3$ used in Example I was much finer than the fused material, and the particles of the calcined material were comparatively regular lamellae while the particles of the fused material were angular and irregular.

Thus it is considered that the particle shape and size contributed to the high porosity in the case by hindering the later stages of reaction-compaction. This point must be considered in choosing materials for reaction-pressing. When heating was continued to 1650° C. in the case described, porosities of the same order as those recorded for the equivalent case using calcined $Al_2O_3$ were obtained.

*Example V*

It was desired to demonstrate that other silicides in addition to $MoSi_2$ can be used to form the intermetallic-type matrix in dispersion type composites produced by reaction-pressing. The representative group of silicides considered for this purpose comprises tantalum disilicide ($TaSi_2$), niobium disilicide ($NbSi_2$), tungsten disilicide ($WSi_2$), and cobalt disilicide ($CoSi_2$). Three more disilicides (titanium, chromium, and vanadium) are considered later in relation to the formation of seals by the process of the invention. In each of the present cases the combination of the powdered components of disilicide and oxide was prepared and reaction-pressed as described in Example I. At this stage the basic reaction-pressing treatment was adjusted to 5 minutes at a temperature approximately 100° C. above the temperature at which reaction-compaction appeared to be complete, instead of 10 minutes at the approximate reaction-compaction temperature, in order that the compact should have a better opportunity to consolidate to a low porosity at a temperature which is still relatively low by comparison with the temperature employed in known fabrication processes to obtain an equivalent result.

It should be noted that relatively high ceramic loadings were used in the cases cited, to serve as a stringent test of the suitability of the silicide for use in forming a cement or matrix according to the process of the invention. It will be understood that compaction can be further improved by using lower ceramic loadings and/or higher finishing temperatures, assuming that the pressure applied to the mold is limited by the graphite presently available.

In all cases sound, well bonded compacts were produced.

A 50:50 wt. percent $TaSi_2$:$Al_2O_3$ (30.9:69.1 vol. percent) compact was heated to 1550° C. for 5 minutes after reaction-compaction had occurred at a moderate rate in the range 1350° C. to 1450° C. In this case $Al_2O_3$ served as a model for europia ($Eu_2O_3$), gadolinia ($Gd_2O_3$) and samaria ($Sm_2O_3$), which could be suitable additions to reactor control rods. The compact was a relatively long one (length approximately three times the diameter) for the single-ended pressing application of the invention, also 50 wt. percent of $TaSi_2$ represents a smaller proportion of the compact by volume than in the 50:50 wt. percent $MoSi_2$:$Al_2O_3$ case (Example I) in view of the considerably higher density of $TaSi_2$. Thus the fact that reaction-compaction was somewhat slower than in the 50:50 $MoSi_2$:$Al_2O_3$ case is to be expected. The calculated total porosity was 10.5% and the observed open porosity 6.7%; this order of porosity is not critical for the control rod application. $Eu_2O_3$, $Sm_2O_3$, $Gd_2O_3$ have considerably higher densities than $Al_2O_3$, so it can be expected that $TaSi_2$:($Eu_2O_3$, $Gd_2O_3$, $Sm_2O_3$) composites can be reaction-pressed with loadings of these oxides in excess of 50 wt. percent.

A 40:60 wt. percent $NbSi_2$:$ThO_2$ (55:45 vol. percent) compact was heated to 1300° C., for 5 minutes after reaction-compaction had occurred fairly rapidly around 1200° C. $ThO_2$ served as a model for $UO_2$ or enriched $UO_2$–$ThO_2$ mixtures, which could be suitable additions to nuclear fuel elements. The total calculated porosity was 2.9% and the observed open porosity less than 0.5%; this low order of porosity could be important for the nuclear fuel element application from the point of view of retaining fission products. The effectiveness of $NbSi_2$ in promoting reaction-compaction is judged to be at least comparable with that of $MoSi_2$.

A 50:50 wt. percent $WSi_2$:$ThO_2$ (51:49 vol. percent) compact was heated to 1320° C. for 5 minutes after reaction-compaction had occurred rapidly around 1220° C. This composition relates to the development of resistance heating elements. The calculated total porosity was 7.5% and the observed open porosity 2.7%; while these figures are low for the composition and the forming conditions, a further reduction could be desirable from the viewpoint of resistance to oxidation which is important for the heating element application, and this should be readily achieved by reducing the oxide loading and/or increasing the finishing temperature, assuming that the pressure applied to the mold is limited by the graphite presently available.

A 50:50 wt. percent $CoSi_2$:$ZrO_2$ (53.6:46.4 vol. percent) compact was heated to 1200° C. for 5 minutes after reaction-compaction had occurred rapidly around 1075° C. $ZrO_2$ served as a model for hafnia ($HfO_2$), which could be a suitable addition to a nuclear reactor control rod. $CoSi_2$ is typical of the medium melting point silicides. The total calculated porosity was 10.7% and the observed open porosity 5.9%; this order of porosity is not critical for the control rod application. Despite the lower reaction-compaction temperature, it appears that $CoSi_2$ is not superior to the higher melting-point silicides, in particular $MoSi_2$ and $NbSi_2$, for the purpose of promoting reaction-compaction of oxide dispersions.

Thus it is established that a representative group of silicides is capable of promoting reaction-compaction according to the process of the invention, and from the foregoing observations and the observations of Example I it is indicated that $MoSi_2$ and $NbSi_2$ are especially suitable for this purpose.

Example VI

As an example of double-ended reaction-pressing, it was desired to make a cylindrical rod 3" long comprising 50% by weight of thoria ($ThO_2$) dispersed in molybdenum disilicide ($MoSi_2$), as a model for a nuclear fuel element. To this end, the mixture of components was prepared as described in Example I and was then packed into a graphite mold with a cavity 8½" long by 5/8" diameter by ramming in a number of stages, leaving room for a graphite plunger to be inserted into each end of the cavity to a depth of at least ¾". The mold was surrounded by suitable thermal insulation and mounted vertically inside a high-frequency induction-heating coil (being one convenient method of heating rapidly). Lead weights were used to transmit a pressure loading to the plungers by means of the double-ended loading system described above.

At the start of the process, a loading of 1500 lb. per square inch was applied and the temperature was raised by induction-heating to 800° C. in a period of about 5 minutes. The loading was then increased to 2500 lbs. per square inch and heating was continued rapidly until reaction occurred. The occurrence of reaction was marked by the rapid movement of the loaded lever system as the plungers followed the contraction caused by the molybdenum and silicon in the mixture reacting to form $MoSi_2$. The reaction temperature for these proportions of finely powdered components is usually between 1150° C. and 1300° C. Heating was continued at 1330° C. for 5 minutes after reaction-compaction had occurred around 1230° C. in a typical case and a product was obtained having a total calculated porosity of 2.4% and an observed open porosity of 0.7%.

In another case, a procedure identical with that described above was followed except that the final heating was carried out at a temperature of 1650° C. for 10 minutes. This gave a product with a total calculated porosity of only 1% and negligible open porosity.

Thus the effectiveness of the double-ended variant of the reaction-pressing process was demonstrated in increasing the length of dispersion-type compact that can be fabricated without reduction of the high order of compaction obtainable by single-ended reaction-pressing of shorter compacts.

Example VII

As a further example of double-ended reaction pressing a complete heating element was fabricated. Mixtures of powdered components for $MoSi_2$, 80:20 $MoSi_2:Al_2O_3$, and 60:40 $MoSi_2:Al_2O_3$ were separately prepared as described in Example I. Sufficient of the 60:40 mixture to make a rod 2½" long was packed into a graphite mold with a cavity 9" long by 5/8" diameter as described in Example VI, and sufficient of the mixture of components for $MoSi_2$ was added to attach ½" of plain $MoSi_2$ to the rod of the 60:40 mixture. The combination of mixtures was then reaction-pressed according to the double-ended procedure described in Example VI. Reaction-compaction occurred over the temperature range 1160° C. to 1270° C., and heating was continued rapidly to 1650° C., this temperature being held for 5 minutes.

The procedure was repeated to obtain a second rod of similar composition. After cleaning any traces of graphite off the ends of the rods and rubbing on emery paper to produce a clean bright surface, the rods were used as plungers in a third double-ended reaction-pressing operation in a shorter graphite mold (7"), with the plain $MoSi_2$ ends outwards and the 60:40 $MoSi_2:Al_2O_3$ ends bearing on sufficient of the 80:20 $MoSi_2:Al_2O_3$ mixture to form a lower-resistance center section of the composite element 2" long. The finishing temperature was again 1650° C., for 5 minutes, and the product was a composite rod of the three sections strongly joined together, constituting a heating element with low resistance ends for attachment of electrical connections, and with a center portion of lower-resistance material than the adjacent main portions of the element, the purpose of this provision being to spread the hottest zone over a greater length of the element when used as a resistance heater.

Example VIII

As a further example relating to nuclear fuel elements, a 50:30:20 wt. percent mixture of components for $NbSi_2:ThO_2:UO_{2.13}$ was prepared and reaction-pressed as described in Example I, i.e. using the single-ended pressing variant of the procedure. Reaction-compaction occurred rapidly around 1150° C., and heating was continued to 1350° C., this temperature being held for 5 minutes. After this relatively low-temperature treatment the calculated total porosity was 4.5% and the observed open porosity 0.7%. Negligible open porosity would be expected at a slightly higher finishing temperature. The nuclear properties of $NbSi_2$ may be satisfactory for practical fuel elements, particularly with enrichment of the uranium dioxide or other nuclear fuel. Numbers of these compacts (approximately 1" long by 5/8" diameter) could be placed together in a suitable container or sheath to make up a complete fuel element, or they could be made in greater lengths and joined together by double-ended reaction-pressing, as described in Example VII, and might then be used as a fuel element without a sheath or "can," the open porosity being negligible or low enough to retain an adequate proportion of fission products.

Example IX

Yet another example relating to nuclear fuel elements demonstrates the practicability of reaction-pressing the fuel elements core and integral sheath in a single application of the process of the invention as described in Example I for single-ended pressing. In this case a graphite mold having a cavity 4" long by 1" diameter was used. Two mixtures of powdered components were prepared as described in Example I, one for the core of the element to form 60:40 wt. percent $MoSi_2:ThO_2$, and one for the integral sheath consisting of components for $MoSi_2$ and a quantity of prereacted $MoSi_2$ equivalent in volume to 40 wt. percent of $ThO_2$. Thus the two mixtures would be expected to compact at similar rates when reaction-pressed. By selective placement and compaction of the two mixtures in the mold prior to reaction-pressing, the finished model element was designed to be approximately 1½" long and to consist of a 3/16" coating of $MoSi_2$ around the 60:40 $MoSi_2:ThO_2$ core. The compact was heated to 1500° C. for 5 minutes after reaction-compaction had occurred rapidly in the vicinity of 1200° C. With minor irregularities the product was found to be substantially as designed.

Example X

In the course of the development of tubular heating elements a short tube of 60:40 wt. percent $TaSi_2:ZrO_2$ was reaction-pressed in a graphite mold having a cavity 4" long by 1" diameter, and having a 5/8" diameter mandrel fitted through the plunger and into the base plug, such that the tubular plunger could slide easily into the annular space remaining. In other respects the preparation and single-ended reaction-pressing procedure were as described in Example I. Reaction-compaction started relatively slowly but accelerated over the temperature range 1230° C.–1320° C., and after finishing at 1500° for 5 minutes, a strong dense tube was obtained from which the graphite mandrel was easily extracted. This procedure is readily capable of development for the fabrication of much larger heater tubes.

Example XI

It was desired to improve the reaction-compaction of mixtures of the components for $MoSi_2$ with high loadings of oxide or carbide powders, such mixtures being prepared as described in Example I. The addition of nickel powder in quantities not exceeding one-quarter of the weight of the MoSi₂ components was found to improve reaction-compaction substantially and to lower the reaction-compaction temperature, by forming in situ a proportion of a mixed silicide phase with portion of the components for MoSi₂.

*Example XII*

In reaction-pressing components of 60:40 wt. percent mixtures for ZrSi₂:ThO₂ according to the procedure of Example I, the reaction-compaction was observed to be sluggish and the products were not uniformly compacted throughout. The nuclear fuel element application was envisaged, and NbSi₂ was an acceptable addition to the silicide phase, Accordingly a mixture of the components for NbSi₂ was added in place of two-fifths of the original weight of the components for ZrSi₂, and the observed reaction-compaction and the uniformity of the products were greatly improved.

In another case it was desired to blend the highly oxidation-resistant silicide MoSi₂ with the high melting-point silicide TaSi₂ in a heating element composite. A 30:30:40 wt. percent mixture of the components for

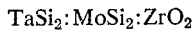
TaSi₂:MoSi₂:ZrO₂ was prepared and reaction-pressed as described in Example I, and was observed to compact fairly rapidly in the range 1200° C. to 1300° C. Heating was continued to 1400° C. for 5 minutes, and the product compared very favorably with compacts reaction-pressed in similar conditions employing single silicides as the matrix.

*Example XIII*

The single-ended reaction-pressing procedure as described in Example I was applied to a mixture of the powdered components for another silicide of molybdenum, Mo₅Si₃, and Al₂O₃ powder in the proportions 70:30 wt. percent of the compounds. The main reaction-compaction occurred around 1350° C., followed by a small continuing movement up to 1650° C., this temperature being held for 5 minutes. A sound, well bonded compact was produced.

*Example XIV*

It was desired to show that the components of a typical aluminide, NiAl, can be used in forming a composite material by the process of the invention, and that compacts can be joined in a further reaction-pressing step, as demonstrated in Examples VII and VIII for silicide-base composites. A mixture of the powdered components for 60:40 wt. percent NiAl:Al₂O₃ was prepared as described in Example I, except that due allowance in excess of the stoichiometric amount of aluminum was made to compensate for the oxide film invariably associated with the particles of aluminum flake powder. The mixture was reaction-pressed according to the single-ended procedure described in Example I, and a marked and rapid reaction-compaction occurred below 600° C. Heating was continued to 1350° for 5 minutes and a sound, well bonded compact was produced. In a further similar reaction-pressing operation a second compact was fabricated and the first one simultaneously joined to it.

*Example XV*

In a further demonstration of the use of NiAl for reaction-pressing, a mixture of the powdered components for 60:40 wt. percent NiAl:Sm₂O₃ was prepared and compacted as described in Example I. Again reaction-compaction occurred rapidly at a temperature below 600° C., and heating was continued to 1350° C. for 5 minutes. The compact was sound and well bonded, and this composition could be useful for the reactor control rod application.

*Example XVI*

It was desired to show that the components ot a typical stannide, Ti₃Sn, can be used in forming a composite material by the process of the invention as described in Example I. A mixture of the powdered components for 70:30 wt. percent Ti₃Sn:ZrO₂ was prepared accordingly, the titanium in the mixture being in the form of a hydride. The final evolution of hydrogen appeared to coincide with the start of reaction-compaction, around 1000° C., and reaction-compaction then continued evenly and definitely to 1400° C., at which temperature it ceased. Heating was continued to 1500° C. for 5 minutes, and the product was a sound, well bonded compact, rather more metallic in appearance than the silicide-base and aluminide-base compacts.

*Example XVII*

It was desired to show that the components of a typical boride, TiB₂, can be used in forming a composite material by the process of the invention as described in Example I. A mixture of the powdered components for TiB₂ (the titanium being added as the hydride) with powdered ZrB₂ (as the pre-reacted compound) was prepared in the proportions 60:40% by wt. and reaction-pressed, substantially as described in Example I except that a mold with a cavity 4″ long by 1″ diameter was used and the plug and plunger of the mold were shaped to produce the compound in the form of a rocket nozzle insert. The main reaction-compaction occurred around 1000° C. with the final evolution of hydrogen, but, the refractory borides being known to be particularly difficult materials to consolidate by established procedures, heating was continued to 1650° C. for 30 minutes. A sound, well bonded product was obtained in the general shape of a rocket nozzle insert.

*Example XVIII*

It was desired to show that the components of a typical germanide, MoGe₂, can be used in forming a composite material by the process of the invention as described in Example I. A mixture of the powdered components for 70:30 wt. percent MoGe₂:Al₂O₃ was prepared and reaction-pressed as described in Example I, reaction-compaction being observed around 1000° C. and heating being continued to 1350° C. for 5 minutes.

Choice of the final treatment temperature after reaction takes place is decided by such considerations as the importance of achieving low or negligible porosity, the melting points of the components, the effect of high temperatures on the mold including the possibility of interaction between mold material and contents, and whether or not it is desirable to partly or wholly sinter the dispersed phase. In nuclear fuel elements, for example, it could be important or even essential to avoid sintering the dispersed particles, while in a dispersion-type heating element sintering of the dispersed phase could be advantageous.

A series of examples of the process of the invention as it applies to the fabrication of seals will now be given. As stated earlier, it is to be understood that the graphite available for the molds limited the safe loads that could be applied to values of the order of 2500 lbs. per square inch, and it is to be expected that in some cases the satisfactory seals obtained could be further improved by the application of higher pressures during the reaction-pressing operation.

*Example XIX*

It was desired to seal together ⅝″ diameter discs of metal-bonded titanium carbide (TiC) and alumina (Al₂O₃), as a model for a reinforced ceramic tool tip. So that the effect of bonding as distinct from mechanical keying might be properly assessed, the mating faces of the discs were ground smooth and flat prior to the cementing operation.

Mo and Si powders in the stoichiometric proportions for MoSi₂ were intimately mixed by blending in a mechanical mortar for half an hour, and a layer of the mixture of uniform thickness was placed between the mating surfaces of the discs in sufficient quantity to permit the dynamic process of reaction-compaction to occur freely. The assembly was inserted into an insulated graphite mold with provision for induction heating and the transmission of pressure to the assembly to be sealed by a plunger loaded by the single-ended pressing system described earlier. The general arrangement was similar to that described in Example I.

With a hanger load equivalent to 1500 lbs. per square inch transmitted to the plunger, the temperature was raised to about 800° C. in about 5 minutes. The load was then increased to 2500 lbs. per square inch and the temperature raised rapidly to 1300° C. (i.e. at least 100° C. above the known range of reaction temperature for $MoSi_2$) at which it was held for 10 minutes. Approaching 1200° C. a small sudden movement in the loaded lever system was observed as the reaction-contraction to form $MoSi_2$ occurred. On cooling, it was found that the alumina and titanium carbide discs were joined by a seal having good mechanical properties and exceptionally low total porosity, open porosity being negligible.

*Example XX*

It was desired to show that a range of combinations of metal-bonded carbides and silicides could be used according to the process of the invention in making seals to aluminum oxide, $Al_2O_3$, which is typical of oxide ceramics with favorable mechanical properties suitable for incorporation in ceramic to ceramic and ceramic to metal seals. To this end, mixtures of the powdered components of the silicides $MoSi_2$, $NbSi_2$, $TaSi_2$, and $WSi_2$ were separately prepared as described in Example XIX, and the various assemblies of the bodies to be sealed and the layer of material to effect the seal were placed in graphite molds and reaction-pressed as described in Example XIX. The combinations so treated were as follows: one of metal-bonded titanium carbide (TiC) or tungsten carbide (WC) as the carbide ceramic body, the powdered components of one of $MoSi_2$, $NbSi_2$, $TaSi_2$ or $WSi_2$ as the intermediate layer, and $Al_2O_3$ as the oxide ceramic body. In all cases the reaction-compaction was observed to occur in the temperature range 1000° C. to 1350° C., and heating was continued for 5 minutes at a temperature in the range 1300° C. to 1450° C. in the first instance. Strong, low-porosity seals were obtained, and it is to be understood that the seals can be further improved in some cases by increasing the finishing temperature and time of heating at this temperature, 1500° C. and 30 minutes being the upper limits employed in the cases considered in the present example.

To demonstrate the superiority of the reaction-pressing process of the invention over the known hot-pressing procedure employing pre-reacted cementing material in place of a reactive mixture of the components, attempts were made to join metal-bonded TiC and WC bodies separately to $Al_2O_3$ bodies with pre-reacted $MoSi_2$ powder as the intermediate layer in place of the mixture of powdered components. Satisfactory seals were not obtained in heating conditions for which the upper limits were 1500° C. and 30 minutes.

*Example XXI*

It was desired to seal together 5/8″ diameter discs of chromium (Cr) and alumina ($Al_2O_3$) by the process of the invention as described in Example XIX. An added provision in this case was for the entry of argon gas into the mold through a port and grooves in the base plug, the metal body being made the lower of the two bodies to be joined so that it received the maximum protection from the argon gas in limiting or preventing interaction with the graphite mold. The reactive mixture in the intermediate layer in this case was a stoichiometric mixture of the powdered components of tantalum disilicide ($TaSi_2$), and when the assembly was reaction-pressed a small but fairly rapid compaction was observed around 1280° C., and heating was continued to 1450° C. for 5 minutes. A satisfactory seal was produced.

In a similar case niobium disilicide ($NbSi_2$) replaced $TaSi_2$ as the intermediate layer formed by reaction in situ. In this case reaction-compaction occurred around 1150° C. and heating was continued to 1350° C. for 5 minutes. A satisfactory seal was produced.

*Example XXII*

It was desired to seal another metallic body, molybdenum (Mo), to alumina ($Al_2O_3$) by the process of the invention. The Mo and $Al_2O_3$ were again in the form of 5/8″ diameter discs, and the intermediate layer employed was a stoichiometric mixture of the powdered components for tungsten disilicide ($WSi_2$); details of the preparation and procedure were as described in Examples XIX and XXI. Reaction-compaction occurred around 1230° C. and heating was continued to 1400° C. for 5 minutes. A satisfactory seal was produced.

*Example XXIII*

It was desired to seal powdered niobium metal (Nb) to alumina ($Al_2O_3$) by the process of the invention. The intermediate layer employed was a stoichiometric mixture of the powdered components for molybdenum disilicide ($MoSi_2$); details of the preparation and procedure were as described in Examples XIX and XXI, except that the 5/8″ dia. $Al_2O_3$ disc was in this case made the lower component of the assembly to be sealed, and the reactive intermediate layer and the top layer of Nb powder were pressed separately into the cavity of the mold above the $Al_2O_3$ disc prior to the reaction-pressing operation. With the Nb powder compacting concurrently the reaction-compaction temperature of the $MoSi_2$ could not be established with certainty, but the finishing temperature was 1500° C., maintained for 10 minutes to improve the compaction of the Nb powder, and from prior knowledge of the temperature range for the $MoSi_2$ reaction it could be safely assumed that reaction had occurred. A satisfactory seal was obtained.

To demonstrate the superiority of the process of the invention over conventional hot-pressing, an identical procedure was followed except that pre-reacted $MoSi_2$ powder was substituted for the mixture of the powdered components. With a finishing temperature of 1500° C., held for 10 minutes, a satisfactory seal was not produced.

*Example XXIV*

It was desired to join a 5/8″ dia. titanium (Ti) metal disc to a 5/8″ dia. ceramic disc previously hot pressed from powdered natural forsterite of basic formula $2MgO \cdot SiO_2$, representative of the crystalline silicate ceramics. (Since this natural material contained a small amount of combined iron, it might also be described as olivine.) The intermediate layer emloyed was a stoichiometric mixture of the powdered components for chromium disilicide ($CrSi_2$) to which a quantity of boron (B) powder was added in the same or a subsequent mixing operation. In this case the amount of B added was 10 wt. percent of the total mixture. Other details of the preparation and procedure were as described in Examples XIX and XXI. The reaction-compaction as in some other cases was not sharply defined at a particular temperature but was clearly discernible in the range 1150° C. to 1200° C. in a typical case. Heating was continued to 1350° C. for 5 minutes, and a satisfactory seal was produced.

It should be noted that the proportion of boron added to the mixture of components for $CrSi_2$ was increased to 25 wt. percent in one case, and in another case the mixture used was in the proportion of the atomic weights of Cr, Si, and B. Satisfactory seals were obtained in both cases.

The foregoing cases were duplicated with the substitution of titanium (Ti) for Cr in the reactive mixture of powders used as the intermediate layer. The only essential difference observed was that reaction-compaction temperatures were of the order of 20° C. to 50° C. lower. The finishing temperature was again 1350° C., held for 5 minutes, and satisfactory seals were obtained.

*Example XXV*

It was desired to seal powdered titanium (Ti, originally as the hydride) to a ⅝″ dia. disc of forsterite. The Cr:Si:B and Ti:Si:B mixtures described in Example XXIV were used separately as the intermediate layer, and as described in Example XXIII the placement of the components in the mold was altered to locate the powdered Ti (hydride) on top. In other respects the preparation and procedure were as described in Examples XIX and XXI. Evolution of hydrogen around 1000° C. resulted in a stage of compaction, making it difficult to discern the actual reaction-compaction of the intermediate layer in some cases. However, the finishing temperature was 1450° C., held for 10 minutes, to assist the consolidation of the Ti metal powder, and from the knowledge provided by Example XXIV it could be safely assumed that reaction had occurred. Satisfactory seals were obtained in all cases.

*Examples XXVI*

It was desired to demonstrate the use of an additional or "buffer" phase between one of the bodies to be joined and the usual intermediate phase, to protect the body concerned from some undesirable interaction. In one such case a seal was made between a ⅝″ dia. platinum (Pt) disc and a ⅝″ dia. forsterite (2MgO·SiO$_2$) disc using a stoichiometric mixture of the components of titanium disilicide (TiSi$_2$) with a 10 wt. percent of boron (B) as the main intermediate phase, and a further layer of a stoichiometric mixture of the powdered components of titanium stannide (Ti$_3$Sn) interposed between the Pt and the TiSi$_2$–B mixture. The general procedure of preparation and reaction-pressing was substantially as described in Examples XVIII and XXI, and a satisfactory seal was obtained by reaction-pressing to 1450° C. for 5 minutes, the Ti$_3$Sn "buffer" being formed in situ and protecting the Pt from excessive embrittlement by direct interaction with the silicide phase.

The process of the invention enables a continuous phase or matrix consisting solely or mainly of one or more compounds of the intermetallic type to be readily formed in composite materials at temperatures much lower than would be required to achive a similar result with pre-reacted intermetallic-type compounds, particularly when these compounds are refractory. Lower temperatures are particularly advantageous when it is not desired to sinter the dispersed particulate material partly or wholly into a continuous phase or when the use of higher temperatures would promote unwanted interaction between the intermetallic-type phase and the dispersed phase, and/or the material of the mold.

Nuclear fuel elements, in which the dispersed phase, or phases, may be fissile and/or fertile, and the matrix is usually nonfissile but may be fertile, may be formed by the process of the invention. The elements may embody a nonfissile sheath solely or mainly composed of one or more compounds of the intermetallic type, the material of the sheath being differentiated by controlling the location of the powdered materials used therefor when they are deposited in the mold prior to being reaction-pressed. Molded parts with high ceramic loadings such as heating elements, inductively-heated tubes, containers and molds, refractory nozzles and combustion chambers or liners therefor, pipes and parts for pumps and valves for use with corrosive liquids, structural components for use at high temperatures and in corrosive conditions, impregnated abrasive laps and wheels, composite tool tip materials, and other refractory ware with special properties such as desired electrical or thermal conductivities, may be manufactured in a single operation or may be molded as separate pieces which are later joined together by cementing or sealing in accordance with the invention.

A further application is the fabrication of intentionally porous compacts (by control of composition, temperature, and pressure) suitable for infiltration to form cermets. The lower silicides may find particular application in this context.

Ceramic-ceramic or ceramic-metal seals can be readily formed with a bonding phase consisting solely or mainly of one or more compounds of the intermetallic type, which could only be formed with considerable difficulty, if at all, by using pre-reacted bonding materials. This advantage applies particularly to seals between refractory components, especially if the seal itself is required to be refractory. By control of time and temperature, the extent of interaction between the intermetallic-type bonding phase and the materials to be joined can be limited to that required to effect a bond, or a "buffer" phase can be introduced if interaction is excessive; reaction temperatures or temperatures a little above reaction temperature usually produce an adequately impermeable seal. The form of the process concerned with the production of seals is particularly useful for the production of electrical and electronic components intended to operate at high temperatures or to be incorporated in high temperature chemical or nuclear reactors. Further applications are the production of reinforced ceramic tools and the attachment of such tools to holders, and the making of laminated ceramic-metal components for structural or other purposes.

In both composites and seals low total porosities and negligible or zero open porosities may be readily obtained even when reaction temperatures are not greatly exceeded during processing, and the product is often adequately gas-tight or vacuum-tight after pressing at or a little above the reaction temperature for up to 10 minutes; if not, it can readily be made so by continuing the pressing operation at a higher temperature and/or for a longer period.

By combining in one or more stages the procedure described for compacts with that described for seals, larger and/or more complex products of uniform or varying composition can be built up. Such products could only be made with considerable difficulty, if at all, by established powder-fabrication techniques using pre-reacted cementing and sealing materials.

It will be apparent that the process of the invention accordingly increases the possible range of products which may be made from combination of ceramic and metallic materials. In particular, many articles which hitherto could only be fabricated from metal or glass may now be improved by making them from ceramic or ceramic-metal composite materials in conjunction with intermetallic-type compounds with a consequent improvement in their resistance to high temperatures and adverse working conditions. Such advantages are of particular use for the difficult working conditions encountered in rockets and in nuclear reactors, but may also be applied to many other useful purposes, especially in the fields of high-temperature mechanical and chemical engineering structural materials, and hard and abrasive tools.

I claim:
1. A process for locating bodies in composite articles essentially by means of a continuous phase of intermetallic type compound which is formed in situ comprising:

placing powdered materials capable of reacting to form at least one intermetallic type compound selected from the group consisting of beryllides, titanides, zirconides, borides, aluminides, silicides, germanides, stannides, and antimonides in contact with the bodies to be located, heatng said materials under a pressure in excess of atmospheric pressure to a temperature at least sufficient to initiate and sustain between said powdered materials a reaction by which said intermetallic type compound is formed, wherein said powdered materials are selected so that during the course of said reaction the reaction mixture and nascent compound exhibit transient plasticity and undergo a marked contraction in solid volume while positively maintaining pressure on the reaction mixture throughout the reaction, whereby a continuous phase of said intermetallic type compound is formed which locates the bodies.

2. A process for the production of a compact in which particulate material is incorporated in a matrix consisting essentially of an intermetallic type compound, comprising the steps of thoroughly mixing powdered materials capable of reacting to form at least one intermetallic type compound selected from the group consisting of beryllides, titanides, zirconides, borides, aluminides, silicides, germanides, stannides, and antimonides together with the particulate material to be incorporated in the compact, heating the mixed materials under a pressure in excess of atmospheric pressure to a temperature at least sufficient to initiate and sustain between the said powdered materials a reaction by which said intermetallic type compound is formed, wherein said powdered materials are selected so that during the course of said reaction the reaction mixture and nascent compound exhibit transient plasticity and undergo a marked contraction in solid volume while positively maintaining pressure on the reaction mixture throughout the reaction, whereby a continuous matrix phase of said intermetallic type compound is formed in which said particulate material is incorporated, the proportion of the said particulate material in the mixed materials being less than that which would prevent a reaction between the components of the intermetallic type compound being initiated and sustained and the continuous matrix phase being formed under the conditions of heat and pressure used in the process.

3. A process for the production of a seal, comprising the steps of thoroughly mixing together powdered materials capable of reacting to form at least one intermetallic type compound selected from the group consisting of beryllides, titanides, zirconides, borides, aluminides, silicides, germanides, stannides, and antimonides, placing a quantity of the mixed powdered materials in contact with at least one other material, heating this assembly of materials under a pressure in excess of atmospheric pressure to a temperature at least sufficient to initiate and sustain between said powdered materials a reaction by which said intermetallic type compound is formed, wherein said powdered materials are selected so that during the course of said reaction the reaction mixture and nascent compound exhibit transient plasticity and undergo a marked contraction in solid volume while positively maintaining pressure on the reaction mixture throughout the reaction, whereby the intermetallic type compound is yielded as a continuous sealing phase bonded to the said at least one other material.

4. The process of claim 2 wherein the said powdered materials are mixed in stoichiometric proportions.

5. The process of claim 2 wherein at least some of the particulate material comprises an intermetallic type compound of the type formed in the matrix.

6. The process of claim 2 wherein heating is continued after the apparent completion of the reaction.

7. The process of claim 2 wherein the reaction mixture is heated in a mold having at least one movable wall through which pressure is applied and positively maintained regardless of the contraction in solid volume which occurs in the reaction mixture.

8. The process of claim 3 wherein the said powdered materials are mixed in stoichiometric proportions.

9. The process of claim 3 wherein the said at least one other material includes at least one powder which is at least partly consolidated concurrently with the formation of the intermetallic type compound.

10. The process of claim 3 wherein the said at least one other material includes a material which is the same as the intermetallic type compound formed in the process.

11. The process of claim 3 wherein heating is continued after the apparent completion of the reaction.

12. The process of claim 3 wherein the reaction mixture is heated in a mold having at least one movable wall through which pressure is applied and positively maintained regardless of the contraction in solid volume which occurs in the reaction.

References Cited

UNITED STATES PATENTS

| 2,854,736 | 10/1958 | Taylor | 75—205 X |
|---|---|---|---|
| 2,887,393 | 5/1959 | Taylor | 106—55 X |
| 2,888,738 | 6/1959 | Taylor | 75—205 X |
| 2,982,619 | 5/1961 | Long | 106—55 |
| 3,050,409 | 8/1962 | Bayer | 106—55 |
| 3,068,016 | 12/1962 | Dega | 75—205 X |
| 3,087,877 | 3/1963 | Goeddel | 75—201 |
| 3,143,413 | 8/1964 | Krapf | 75—206 |
| 3,222,438 | 12/1965 | Parr | 106—55 |

FOREIGN PATENTS

| 887,658 | 2/1959 | Great Britain. |
|---|---|---|

L. DEWAYNE RUTLEDGE, *Primary Examiner.*

BENJAMIN R. PADGETT, *Examiner.*

A. J. STEINER, *Assistant Examiner.*